(12) United States Patent
Gustafsson

(10) Patent No.: US 8,297,400 B2
(45) Date of Patent: Oct. 30, 2012

(54) STEERING ASSIST ARRANGEMENT FOR MOTORCYCLES

(75) Inventor: Leif Gustafsson, Holmsjo (SE)

(73) Assignee: Ohlins Racing AB, Upplands Vasby (SE)

( * ) Notice: Subject to any disclaimer, the term of this patent is extended or adjusted under 35 U.S.C. 154(b) by 692 days.

(21) Appl. No.: 11/917,333

(22) PCT Filed: Jun. 19, 2006

(86) PCT No.: PCT/SE2006/000751
§ 371 (c)(1),
(2), (4) Date: Sep. 9, 2009

(87) PCT Pub. No.: WO2006/137788
PCT Pub. Date: Dec. 28, 2006

(65) Prior Publication Data
US 2009/0314570 A1 Dec. 24, 2009

(30) Foreign Application Priority Data
Jun. 20, 2005 (SE) ........................................ 0501416

(51) Int. Cl.
*B62K 21/00* (2006.01)
*B62K 21/08* (2006.01)
*B62D 5/14* (2006.01)
(52) U.S. Cl. ......... 180/429; 180/426; 280/280; 280/272
(58) Field of Classification Search .................. 280/272, 280/279, 280, 89, 89.1, 89.11, 89.13, 90; 180/426, 429, 438, 439, 440, 441
See application file for complete search history.

(56) References Cited

U.S. PATENT DOCUMENTS
4,558,759 A * 12/1985 Baatrup et al. ................ 180/403
(Continued)

FOREIGN PATENT DOCUMENTS
DE 3221741 A1 12/1983
(Continued)

OTHER PUBLICATIONS
International Search Report for International Application No. PCT/SE2006/000751, dated Oct. 3, 2006.
(Continued)

*Primary Examiner* — Paul N. Dickson
*Assistant Examiner* — Wesley Potter
(74) *Attorney, Agent, or Firm* — Knobbe Martens Olson & Bear, LLP

(57) ABSTRACT

An arrangement is utilized for reducing the manual steering force associated with steering a motorcycle. A steering assist for a vehicle includes a handlebar, and the handlebar being rotatable around a center of rotation. The steering assist further includes a damping device that includes a damping chamber, and a hydraulic valve being in fluid communication with the damping chamber and includes a first shaft section and a second shaft section. The hydraulic valve also includes a bearing mounting, and a bearing mounted in the bearing mounting. The steering assist further includes an upper fork crown attached to the first shaft section of the hydraulic valve, and a lower handlebar mounting attached to the second shaft section via the bearing arranged in the bearing mounting of the hydraulic valve. The handlebar being attached to the lower handlebar mounting, and the damping device being attached to the bearing mounting and the upper fork.

11 Claims, 4 Drawing Sheets

U.S. PATENT DOCUMENTS

| | | | |
|---|---|---|---|
| 4,712,633 A * | 12/1987 | Suzuki et al. | 180/429 |
| 5,076,383 A | 12/1991 | Inoue et al. | |
| 5,253,730 A * | 10/1993 | Hayashi et al. | 180/426 |
| 5,873,428 A | 2/1999 | Ohshita et al. | |
| 5,894,903 A | 4/1999 | Hieble | |
| 6,129,111 A | 10/2000 | Asbrand et al. | |
| 6,332,625 B1 * | 12/2001 | Fukunaga et al. | 280/280 |
| 6,708,795 B2 * | 3/2004 | Hasegawa et al. | 180/423 |
| 6,742,794 B2 * | 6/2004 | Bunya et al. | 280/272 |
| 2003/0051937 A1 | 3/2003 | Takamoto | |
| 2004/0099470 A1 | 5/2004 | Tanigaki | |
| 2005/0077100 A1 * | 4/2005 | Hasegawa | 180/426 |
| 2006/0151225 A1 * | 7/2006 | Tsujii et al. | 180/209 |

FOREIGN PATENT DOCUMENTS

| | | |
|---|---|---|
| EP | 0900722 A | 3/1999 |
| EP | 1 151 913 A1 | 11/2001 |
| EP | 1248013 | 10/2002 |
| EP | 1291276 | 3/2003 |
| GB | 2030531 | 4/1980 |
| JP | 1103592 | 4/1989 |
| JP | 04011573 | 1/1992 |
| JP | 2011046342 A * | 3/2011 |
| WO | WO 99/61302 A1 | 12/1999 |
| WO | WO 03070554 | 8/2003 |
| WO | WO 2005/061261 A1 | 7/2005 |

OTHER PUBLICATIONS

Supplemental International Search Report; Jun. 23, 2008; 7 pages.

* cited by examiner

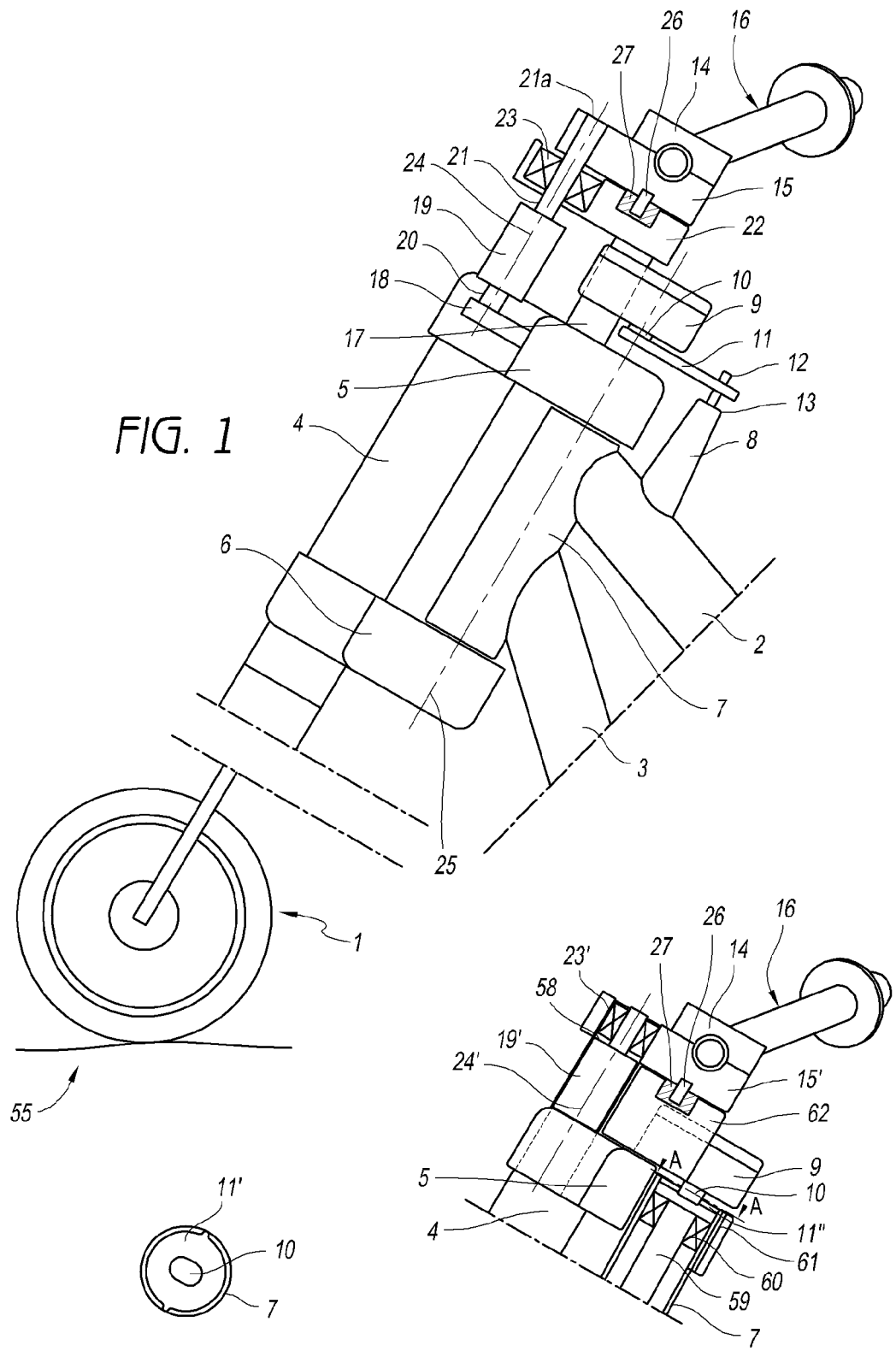

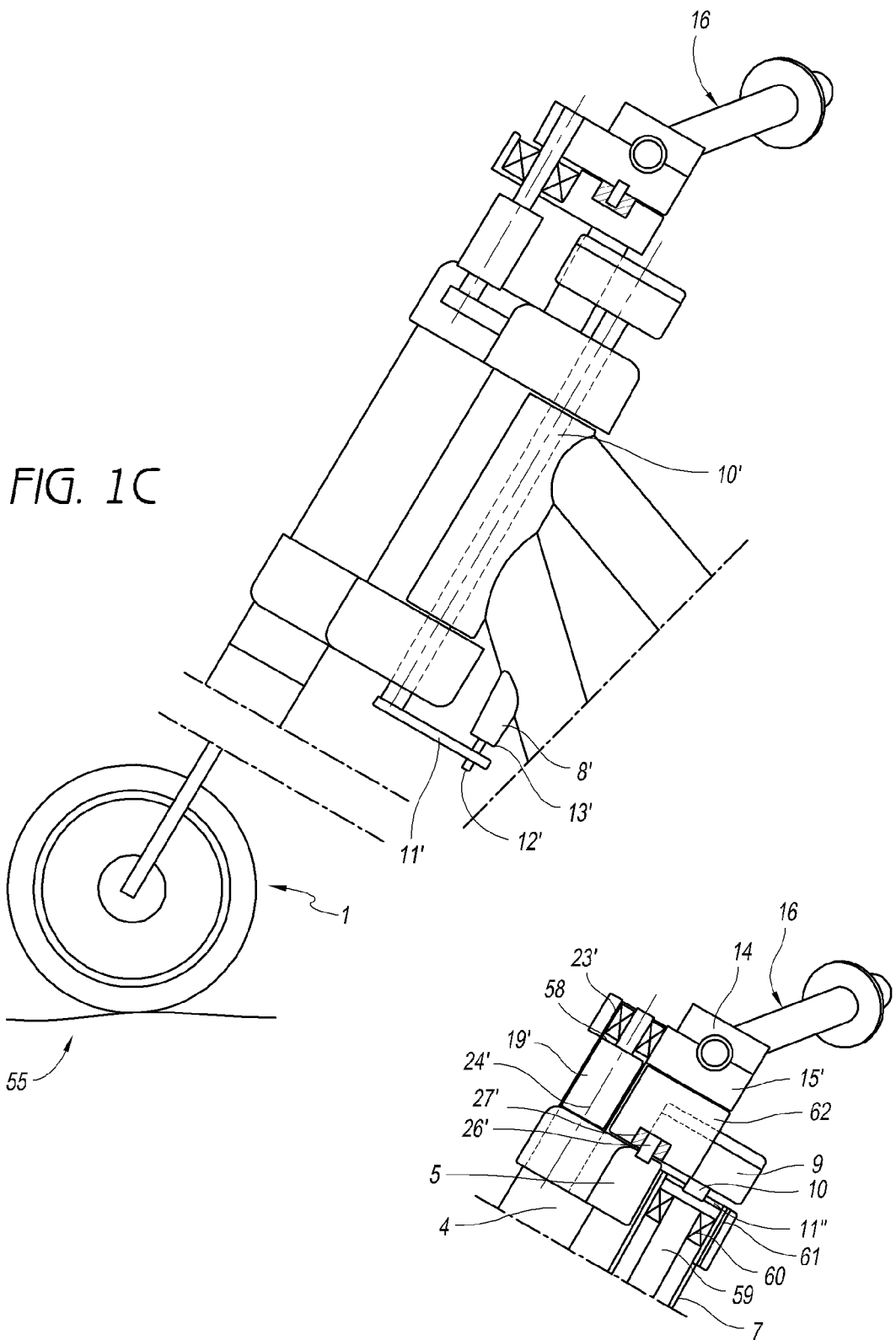

STEERING ASSIST ARRANGEMENT FOR MOTORCYCLES

CROSS-REFERENCE TO RELATED APPLICATION

This application claims the benefit and priority to and is a U.S. National Phase of PCT International Application Number PCT/SE2006/000751, filed on Jun. 19, 2006, designating the United States of America and published in the English language, which claims priority under 35 U.S.C. §119 to Swedish Application Number 0501416-2, filed on Jun. 20, 2005. The disclosures of the above-referenced applications are hereby expressly incorporated by reference in their entireties.

BACKGROUND OF THE INVENTION

1. Field of the Invention

The present invention generally relates to an arrangement preferably intended for motorcycles that, in association with steering, would benefit from a reduction in the steering force. The motorcycles can feature a handlebar that is rotated around a center of rotation by a steering force and damping devices that are operated by a damping medium to take up movement that is transmitted to the handlebar due to unevenness in the surface upon which the motorcycle is being driven.

2. Description of the Related Art

Reference is made to two-wheel drive motorcycles and to heavy motorcycles that are heavy to steer during certain driving situations. "Heavy motorcycles" as used herein means motorcycles weighing 400 kg or more. With, two-wheel drive motorcycles (that is both rear and front wheel drive), the driving characteristics differ from those of more traditional motorcycles. On severe bends, the front wheel trail (commonly known as a measurement of the distance between an axis, or spindle, of the front wheel and an intersection of the steering axis of the handlebar and the ground, which is usually forward of the steering axis due to an offset of a wheel spindle from the steering axis) causes a turning force that requires an application of large manual counter forces to the wheel. In addition, it generally is necessary to use large manual steering forces (also deflection forces) on two-wheel drive motorcycles. Moreover, large manual steering forces must be used under certain driving conditions when operating large or heavy motorcycles.

Motorcycles with two-wheel drive are already known by, among other things, patent applications submitted by the applicant of the present application; see for example WO 03070554 and PCT/SE2004/001782. Heavy motorcycles are to be found in abundance on the open market.

SUMMARY OF THE INVENTION

There is, in general, a need to improve the steering function on motorcycles and similar vehicles. An object of certain embodiments of the present invention is to solve this problem, not only for the motorcycles mentioned, but also, in general, for other motorcycles that also would benefit from such a feature. There is also a desire to be able to integrate the new function with existing components on the motorcycle or vehicle. Certain embodiments of the invention provide close interaction with existing damping devices on the vehicle. In the case of two-wheel drive motorcycles with hydraulic front wheel drive, a hydraulic unit associated with the drive also can be utilized as a power source for a servo function. In some embodiments, power sources that comprise or operate with electrical energy can be utilized. There is also a desire to increase the acceleration and to maintain the increased acceleration over an extended period of time, even when the surface upon which the vehicle is being driven is very uneven. Conventional arrangements are believed to be unable to accommodate such increased acceleration. Tests have shown reductions in engine speed from, for example, 37 seconds with motorcycles having prior constructions to 35 seconds with motorcycles that utilize certain features, aspects and advantages of the invention.

In some embodiments, a servo function is provided that reduces the manual deflection force or counter force with a damping medium. In some embodiments, it is also described how this arrangement interacts with, and is mounted in relation to, vehicle-specific components, such as, for example, a front fork, a handlebar and a frame.

In some embodiments, the servo function contains a device, by means of which the servo function can be actuated by turning of the handlebar. The control device is connected to a hydraulic unit that delivers hydraulic pressure or hydraulic medium pressure to assist in deflection or countering forces. The arrangement preferably comprises a valve that determines the flow direction of the hydraulic oil. In an embodiment, the damping device can consist of a blade damper. Other types of damping device, however, are possible. For example, damping devices based on cylinders and pistons also can be used. In a further configuration, a hydraulic valve also can be included, the longitudinal axis of which extends along the axis of rotation of the handlebar. The hydraulic valve is arranged to rotate around its longitudinal axis after a predetermined initial rotational movement of the handlebar. A countering device can be structured to determine the size of the initial movement.

Additional further developments will be apparent from the following subsidiary claims.

BRIEF DESCRIPTION OF THE DRAWINGS

By means of what is proposed in the above, a technically advantageous construction, function and assembly of the servo function can be obtained. Existing components on the motorcycle can be utilized for the servo function as well as for their original function and thus, for example, a blade damper function can easily be modified for servo steering and the blade damper can be connected to the hydraulic valve in a very simple way. A currently proposed embodiment of an arrangement that has the significant characteristics of the invention will be described below, with reference to the attached drawings, in which FIG. 1 schematically shows in vertical view, a front portion of a motorcycle that is equipped with a servo function;

FIG. 1a schematically shows in vertical view, a second embodiment of the front portion of the motorcycle, with certain parts being shown in cross section;

FIG. 1b shows in a section taken along the line A-A in FIG. 1a, the section showing the steering column of the motorcycle in cross section;

FIG. 1c schematically shows in vertical view, a front portion of another embodiment of a motorcycle that is equipped with a servo function;

FIG. 1d schematically shows in vertical view, a front portion of another embodiment of a motorcycle, with certain parts being shown in cross section;

DETAILED DESCRIPTION OF THE PREFERRED EMBODIMENT

Figure 2:
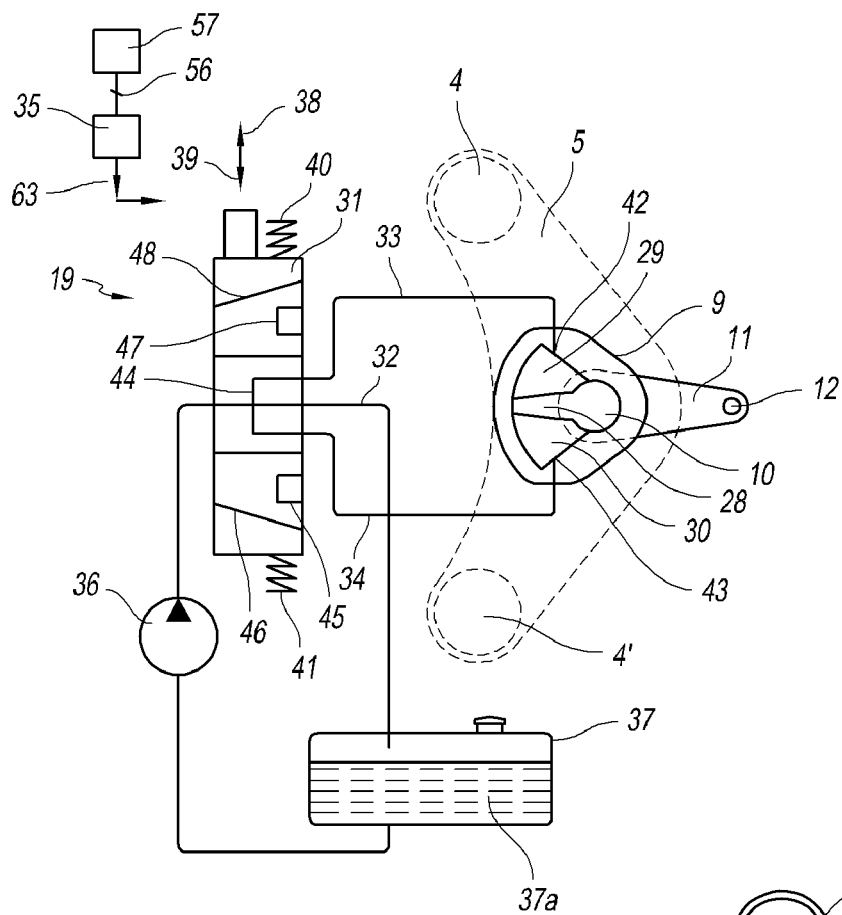
FIG. 2 schematically shows portions of the motorcycle and blade damper device along with a control device and a hydraulic unit.

In FIG. 1, a front wheel on a motorcycle is indicated by 1. A portion of the frame of the motorcycle is indicated in outline by frame parts 2, 3. A front fork of the motorcycle is indicated by 4 and an upper fork crown and a lower fork crown are indicated by 5 and 6 respectively. The ends of the frame parts 2, 3 are attached to a steering column 7. The front wheel 1 can be steered around an axis of rotation 25 that extends through a center of the steering column 7.

The upper frame part 2 is provided with a bracket 8. A damping device, in the form of a blade damper, is indicated by 9. A blade for the blade damper, that is not shown in FIG. 1, is connected to a bearing shaft 10, that has a center of rotation that coincides with the axis of rotation 25 and that is attached to a part 11 that tapers outwards from the damper 9. This part 11 is mounted on a pin 12 that extends out from a free end 13 of the bracket 8.

The arrangement also shows upper and lower mountings 14, 15 for a handlebar 16. The upper and lower handlebar mountings 14, 15 are connected to the upper fork crown 5 by fixing parts 17, one of which is shown in FIG. 1. The upper fork crown 5 is provided with a mounting 18, upon which a hydraulic valve 19 is mounted. The hydraulic valve 19 has a first shaft section 20. The first shaft section 20 fixes the valve 19 in the mounting 18. The hydraulic valve 19 also is provided with a second shaft section 21.

The handlebar mountings 14, 15 also are attached to a bearing mounting 22 that is attached, together with the handlebar mountings 14, 15, to the upper fork crown 5 via the bearing parts 17. The handlebar mounting 15 and the bearing mounting 22 are in contact with each other. The handlebar mountings 14, 15 clamp around the handlebar 16 and give this a fixed position in relation to the horizontal part of the handlebar 16.

The bearing mounting 22 is provided with a bearing 23 that journals the shaft 21 of the hydraulic valve 19. The second shaft section 21 (e.g., hydraulic valve shaft) extends through the bearing 23 and its end portion 21a is attached to the lower handlebar mounting 15. The mountings 14, 15 that hold the handlebar 16 are capable of rotating relative to the bearing mounting 22. During rotation between the handlebar mountings 14, 15 and the bearing mounting 22, the second shaft section 21, 21a of the hydraulic valve 19 rotates around a central axis 24 of the hydraulic valve 19 and gives an angle of rotation α between the first and second shaft sections 20, 21.

The hydraulic valve 19 is thereby arranged to control or affect the flow of medium for the damping device 9, in accordance with what is described below. The control is initiated after an initial rotational movement of the handlebar 16. The size of this initial rotational movement can be determined by a device 26, such as a pin, arranged in the lower handlebar mounting 15. The device 26 extends downward and interacts with a countering device 27. The countering device 27 is positioned in the bearing mounting, which has a space for the countering device 27. The countering device 27 can comprise a rubber ring, a spring arrangement, a torsion spring, etc. In one embodiment, the countering device 27 is a ring made of expanded polyurethane.

FIG. 1c also shows another arrangement of an embodiment similar to that shown in FIG. 1. In this arrangement, the outgoing bearing shaft 10' of the damping device 9 extends through, and terminates outside of, the lower end of the steering column 7. A part 11' is attached to a lower end of the extended shaft 10'. The part 11' is mounted on a pin 12' that projects outward from a free end 13' of a bracket 8'. The bracket 8' is attached to the lower frame section 3. The illustrated arrangement works in generally the same way as the arrangement described above.

FIG. 2 shows the upper fork crown 5 with the front forks 4, 4'. In addition, FIG. 2 shows the position of the damping device 9, the part 11 and the pin 12. The bearing shaft 10 of the blade damper 9 also is shown. A blade 28 operates in a space generally defined by partial spaces 29, 30 on both sides of the blade 28.

The function of the hydraulic valve 19, in accordance with known hydraulic technology, can be considered to comprise a slide 31 that can move in a longitudinal direction and can assume three different longitudinally displaced positions in relation to hydraulic pipes 32, 33 and 34. The longitudinally displaced position for the slide 31 is controlled by an electrical signal 63 that is obtained from an electrical control device 35. The effect on the slide 31 caused by the electrical signal 63 is schematically indicated. In the illustrated case, the slide 31 assumes its middle position.

The hydraulic valve 19 is provided with a pressure-generating part 36 and a return part or reservoir 37. The movement of the slide 31 from the middle position shown in FIG. 2 to each end position is symbolized by arrows 38, 39. As a result of the movement in either direction caused by the signal, the movement continues as long as the signal is maintained, and, when the signal ceases, the slide 31 assumes its middle position due biasing forces of return springs 40, 41.

The hydraulic pipe 33 is connected to the partial space 29 via a connector 42. In a corresponding way, the hydraulic pipe 34 is connected to the partial space 30 via a connector 43.

In FIG. 2, the hydraulic valve 19 assumes its middle position as long as the handlebar 16 is not moved and as long as the initial movement of the handlebar 16 does not exceed a predetermined amount. When the slide 31 is in the middle position, the partial spaces 29, 30 are connected to each other via the hydraulic pipes 33, 34 and by a duct 44 in the slide. In the middle position, the damping device 9 can work completely independently of the servo function and can carry out its damping function via damping devices such as, for example but without limitation, holes, shims, etc, arranged in the damper 9. The function of the blade damper 9 is already well known and therefore will not be described in greater detail here. In the middle position, the pressure-generating device 36 (e.g., pump) is connected directly to the reservoir 37.

The slide 31 has a part comprising first ducts 45, 46. When the handlebar 16 is turned in either direction, the slide 31 assumes the relevant end position, with the result that these ducts 45, 46 are aligned with the hydraulic pipes 32, 33, 34. The pressurizing device 36 is thereby connected to the second partial space 30 in the blade damper via the duct 46. The duct 33 is connected to the reservoir 37 via the duct 45, which means that the partial space 29 also is connected to the reservoir 37. The damping function of the blade damper 9 thereby is completely or at least partially inoperative and the pressure-generating device 36 changes the pressure in the partial space 30 to move the blade 28, which assists in the servo function. During movement of the blade 28 in its space 29, 30, medium is led from the second partial space 30 to the reservoir 37. When the slide 31 assumes the second position where ducts 47, 48 are aligned with the hydraulic pipes 32, 33, 34, the pressurizing device 36 is connected to the first partial space 29 and the second partial space 30 is connected to the reservoir 37.

Figure 3:
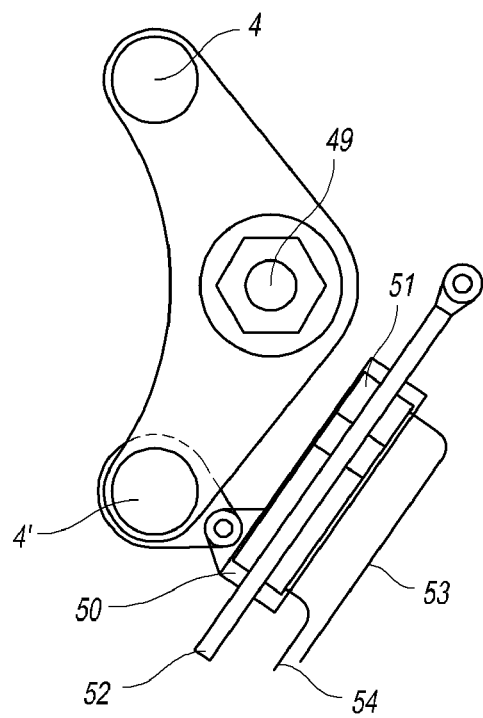
FIG. 3 schematically shows another construction of the motorcycle and damper device.

FIG. 3 shows a different type of damping device. FIG. 3 shows the front forks 4, 4' and a center of rotation 49 of the fork crown 5. A damper device 9 is utilized that comprises a cylinder 50 in which a piston 51 operates. A piston rod 52 connects to the piston 51 and connecting pipes 53, 54 connect to the hydraulic valve and correspond to the pipes 33, 34 in FIG. 2.

Figure 4:
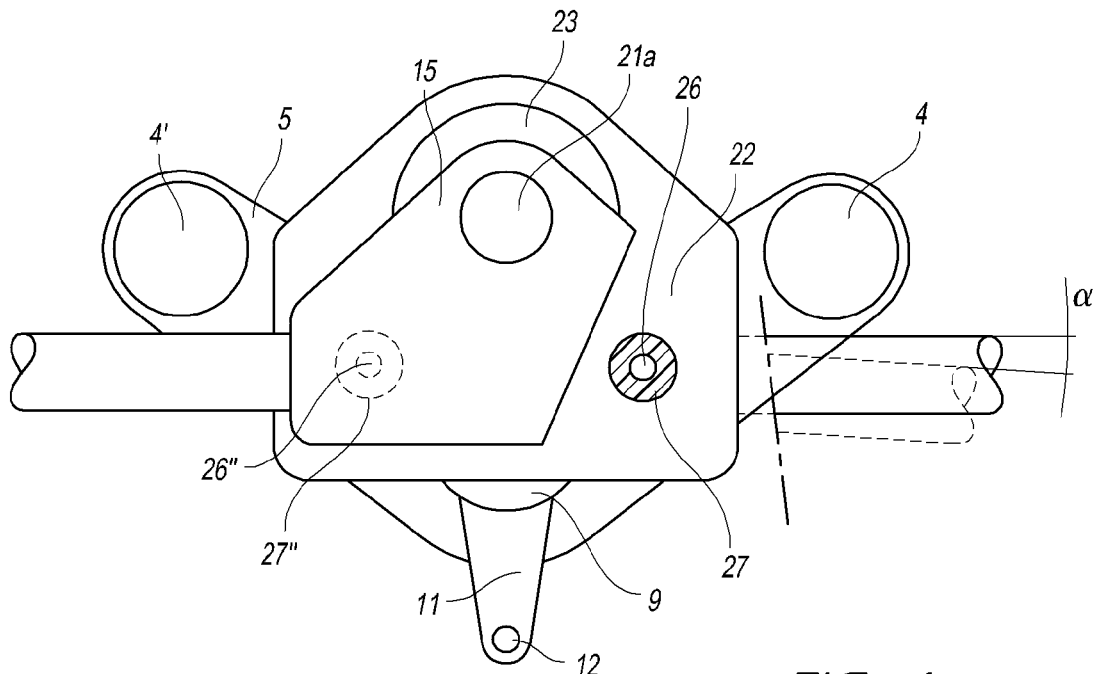
FIG. 4 is a top view of some of the components of FIG. 1.
Figure 5:
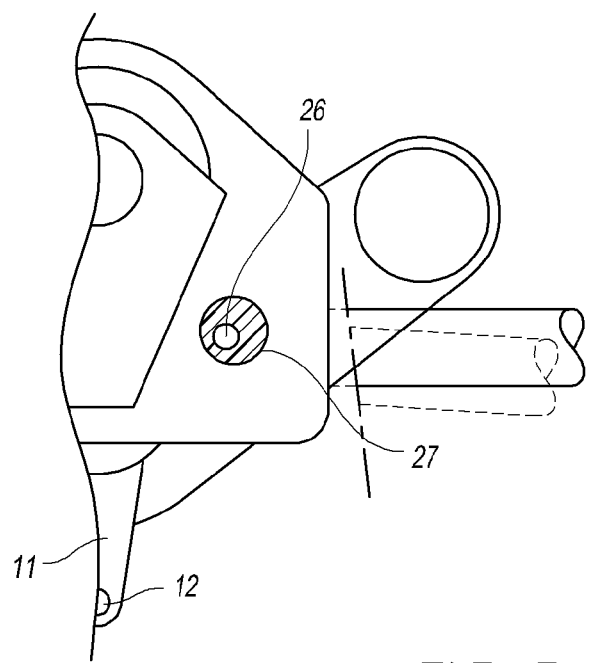
FIG. 5 shows a top view similar to FIG. 4 in which the steering column has been turned.

FIGS. 4 and 5 show the arrangement illustrated in FIG. 1 viewed from above and in partial cross section. As shown in FIG. 4, the illustrated arrangement comprises two countering devices 27, 27" that are located at a distance from each other. The countering devices 27, 27" and the pins 26, 26" have the same construction. When the handlebar 16 assumes its neutral position as far as steering deflection is concerned, the pins 26, 26" are located in the center of the respective countering devices 27, 27". FIG. 4 also shows the upper fork crown 5, the front forks 4, 4' and the lower handlebar mount 15. In addition, FIG. 4 shows the part 11 and the pin 12. Similarly, it shows the position of the blade damper 9 relative to the other parts. When the handlebar 16 is given a deflection α that exceeds a particular value, the electrical control device 35 issues the electrical signal 63 and the slide 31 in the hydraulic valve 19 is moved to control flow of fluid in the system.

FIG. 5 shows an initial movement greater than a predetermined size, which means that the pin 26, for example, has moved from a central position, such as that shown in FIG. 4. The movement of the pin 26 results in the adjustment of the slide 31 to the relevant end position described above. Movement of the slide 31 places the pressure-generating device 36 in fluid communication with one side of the blade 28. As a result of the pressure-generating device 36 being connected to one side of the blade 28 and, at the same time, the medium in the partial space on the other side of the blade 28 being led away, a steering input is added to the manual steering force. The servo function that is obtained in this way thus participates in the deflecting or countering function and it is possible to obtain a reduction in the manual steering force that is required.

In FIG. 2, a medium 37a used in the system, such as, for example but without limitation, hydraulic oil with any additives. The motorcycle can be driven over uneven surfaces 55, such as those shown in FIG. 1. Moreover, as shown in FIG. 2, a switch 56 can be provided to control operation of the servo function through connection to a battery power source 57. The pressure-generating device 36 acts upon the relevant side of the blade or piston in response to the hydraulic medium pressure that is generated by the hydraulic unit. This generation of pressure can be dependent upon the driving speed, which has advantages as far as function of the servo system is concerned. At speeds where it is necessary to add servo force to the manually-applied steering force, the servo function is more active, and vice versa.

FIG. 1a shows parts of the arrangement in cross section, with the construction of the steering column 7 being illustrated in particular. The axis of rotation of the outgoing shaft 10 of the damping device 9 (e.g., the blade damper 9) preferably coincide with or essentially coincide with the axis of rotation 25. An upper fork crown 5 is shown in FIG. 1a as are upper and lower mountings 14, 15' for a handlebar 16.

The steering column 7, the front fork 4 and an outer casing 58 of the illustrated hydraulic valve 19' are attached to the upper fork crown 5. A bearing 23' is incorporated inside the outer casing 58, which bearing 23' enables the hydraulic valve 19' to rotate around its axis of rotation 24' and enables there to be an angle of rotation α between the incoming and outgoing shafts of the hydraulic valve 19'.

A steering shaft 59 is arranged in the steering column 7. This steering shaft 59 is mounted at its upper and lower part by bearings 60 that are supported in the outer casing of the steering column 7 or a sleeve (not shown). The upper fork crown 5 is, in turn, mounted by a bearing 61 to the upper part of the outer casing of the steering column 7 or the sleeve, so that the front wheel of the motorcycle turns in conjunction with the rotation of the handlebar 16.

The illustrated device also has two support devices 62 (only one of which is shown), that are placed symmetrically around the central axis 24'. The support devices 62 join together the upper fork crown 5 and the lower handlebar mounting 15'. Devices or pins 26 (only one of which is shown) are arranged between these support devices 62 and the lower handlebar mounting 15'. The illustrated pins 26 determine the initial rotational movement of the handlebar. The pins 26 extend down into and interact with the countering devices 27 that are arranged in corresponding parts in the support devices 62. The pins 26 and the countering devices 27 work together in the same way as described above.

FIG. 1d illustrates an alternative embodiment of FIG. 1a. Devices or sins 26' (only one of which is shown) are arranged between these support devices 62 and the fork crown 5. The pins 26' determine the initial rotational movement of the handlebar. The pins 26' extend up into and interact with the countering devices 27' that are arranged in support devices 62. The sins 26' and the countering devices 27' work together in the same way as described above.

With continued reference to FIG. 1a, a part 11" is attached in the upper part of the outer casing of the steering column 7 or the sleeve, which part joins together the outgoing shaft 10 of the damping device 9 and the frame parts 2, 3 that do not rotate when steering takes place, in such a way that the steering movement is damped and the servo effect can be obtained. This part is illustrated in FIG. 1b that shows a section A-A through the upper part of the steering column 7.

The hydraulic valve and the assembled devices that are described in the second embodiment can, of course, also be used together with the first embodiment.

The invention is not limited to the embodiments described above as examples, but can be modified within the framework of the following claims and concept of the invention.

The invention claimed is:

1. A steering assist for a vehicle comprising a handlebar, the handlebar being rotatable around a center of rotation, a damping device comprising a damping chamber, a hydraulic valve being in fluid communication with the damping chamber and comprising a first shaft section and a second shaft section, the hydraulic valve also comprising a bearing supporting the second shaft section, an upper fork crown attached to the first shaft section of the hydraulic valve, a lower handlebar mounting attached to the second shaft section, the handlebar being attached to the lower handlebar mounting, and the damping device being attached to the upper fork crown.

2. The steering assist in claim 1, wherein a longitudinal axis of the hydraulic valve extends parallel to the center of rotation of the handlebar and the hydraulic valve is rotatable around the longitudinal axis after a predetermined initial rotational movement of the handlebar.

3. The steering assist in claim 1, wherein the damping device further comprises a blade damper, a blade attached to the blade damper, and a bearing shaft attached to the blade damper.

4. The steering assist in claim 1, wherein a bearing mounting supports the bearing and supports a countering device that interacts with a device attached to the lower handlebar mounting, and wherein the countering device and the device are arranged to determine an amount of the initial rotational movement of the handlebar.

5. The steering assist in claim 1 further comprising a support device, wherein the support device joins together the upper fork crown and the lower handlebar mounting, a device is arranged between the support device and the lower handlebar mounting, wherein the device extends down in a countering device that is arranged in a corresponding part in the support device in such a way as to determine the initial rotational movement of the handlebar.

6. The steering assist in claim 1, wherein the hydraulic valve is arranged to at least partially disconnect a damping function of the damping device in the event of a deflection rotational position larger than an initial rotational position for a connection of a servo function.

7. The steering assist in claim 1, wherein the vehicle is arranged for combined rear and front wheel drive with a trail between a vertical axis through a steering axis of the handlebar and in a direction towards a support surface and a point of contact of the front wheel with the support surface, and wherein the trail causes a counter turning force in the event of a rotational deflection.

8. The steering assist in claim 1 further comprising a bearing mounting that supports the bearing a device being arranged between the bearing mounting and the lower handlebar mounting, wherein the device extends down in a countering device that is arranged in a corresponding part in the bearing mounting in such a way as to determine the initial rotational movement of the handlebar.

9. The steering assist in claim 1, wherein the lower handlebar mounting is attached to the second shaft section via the bearing.

10. The steering assist in claim 9, wherein the bearing is positioned inside of an outer casing of the hydraulic valve.

11. The steering assist in claim 1, wherein the damping device further comprises a blade damper, a blade attached to the blade damper, and a bearing shaft attached to the blade damper, the bearing shaft having a center of rotation that substantially coincides with a steering axis of a front wheel of the vehicle.

\* \* \* \* \*